Figure 1:
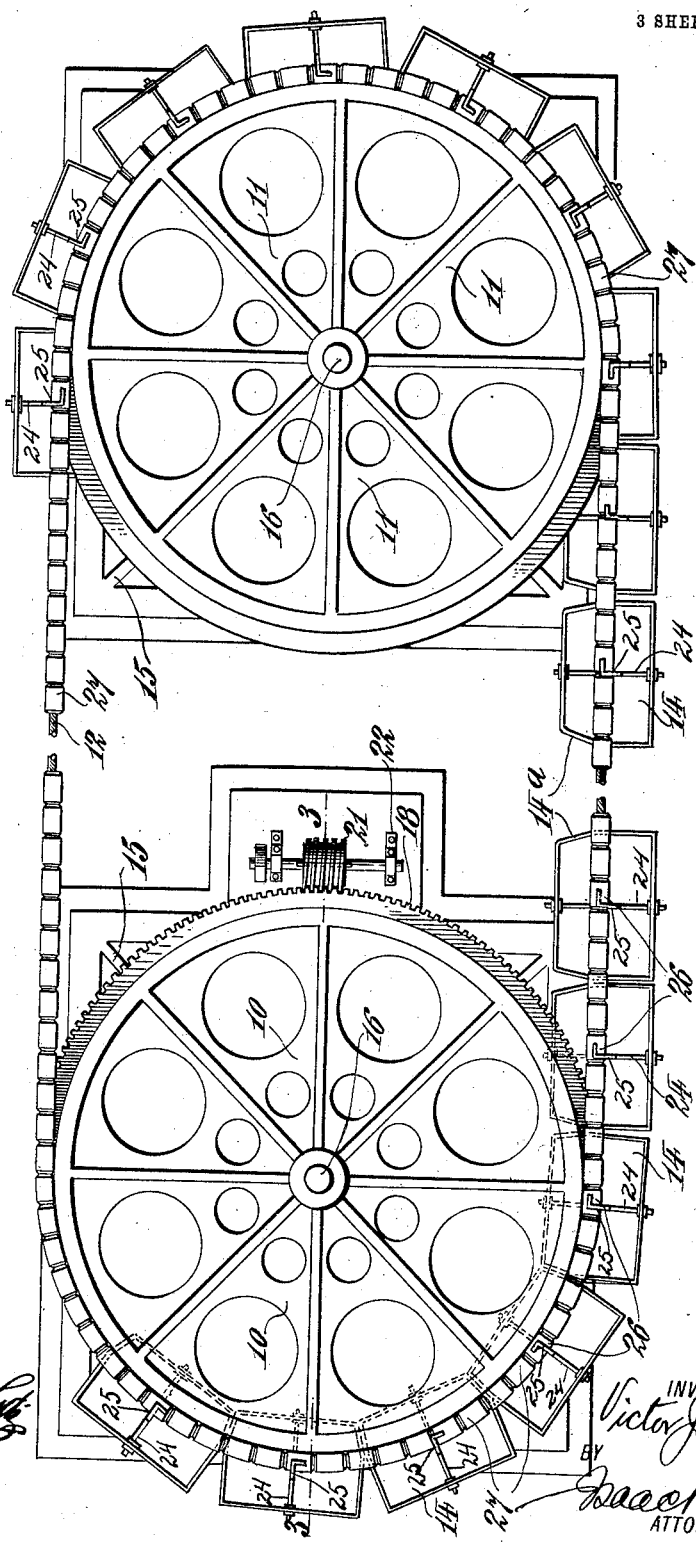

V. JOHNSON.
CONVEYER.
APPLICATION FILED FEB. 23, 1909.

987,302.

Patented Mar. 21, 1911.
3 SHEETS—SHEET 1.

WITNESSES

INVENTOR
Victor Johnson
BY
Isaac B. Owens
ATTORNEYS

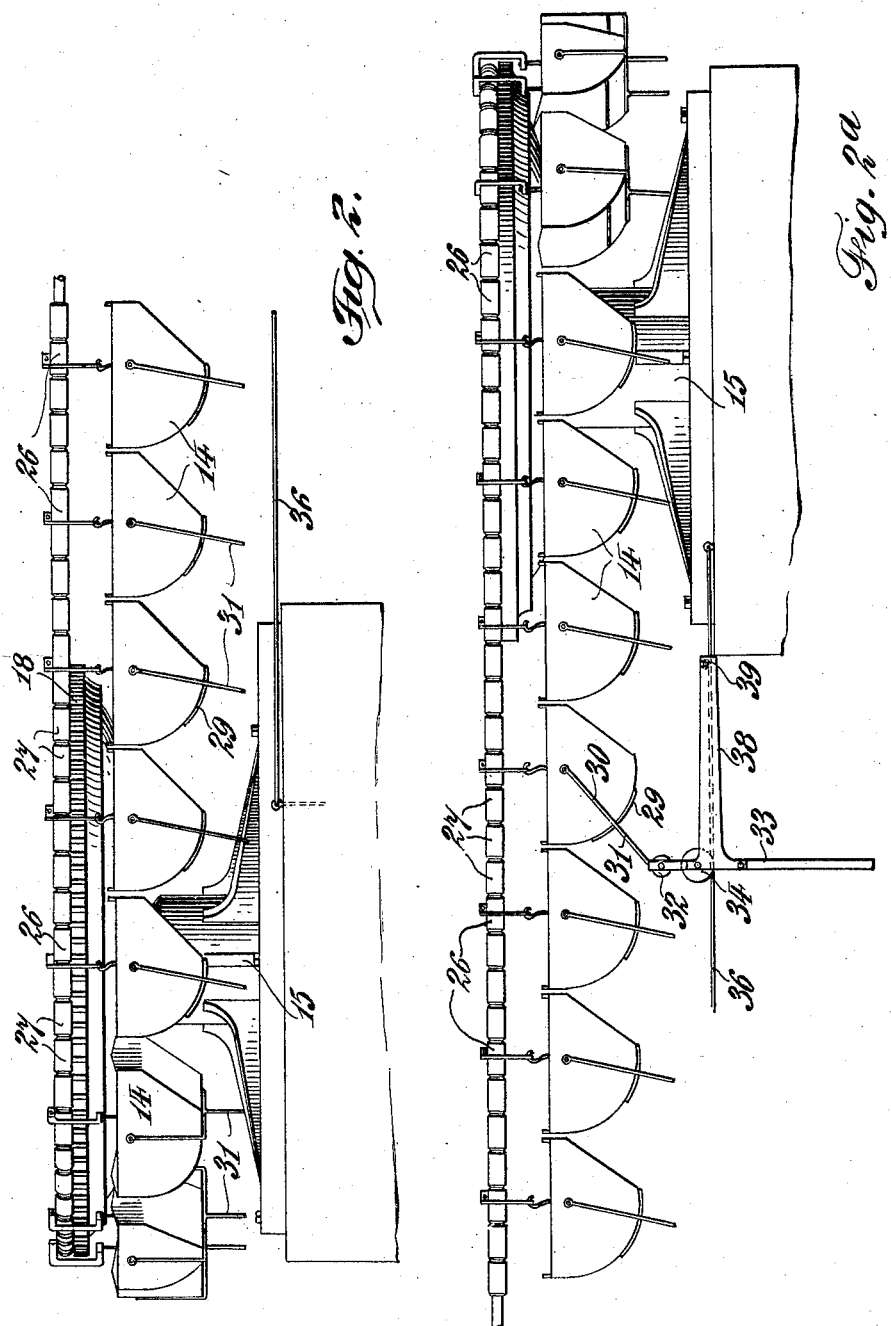

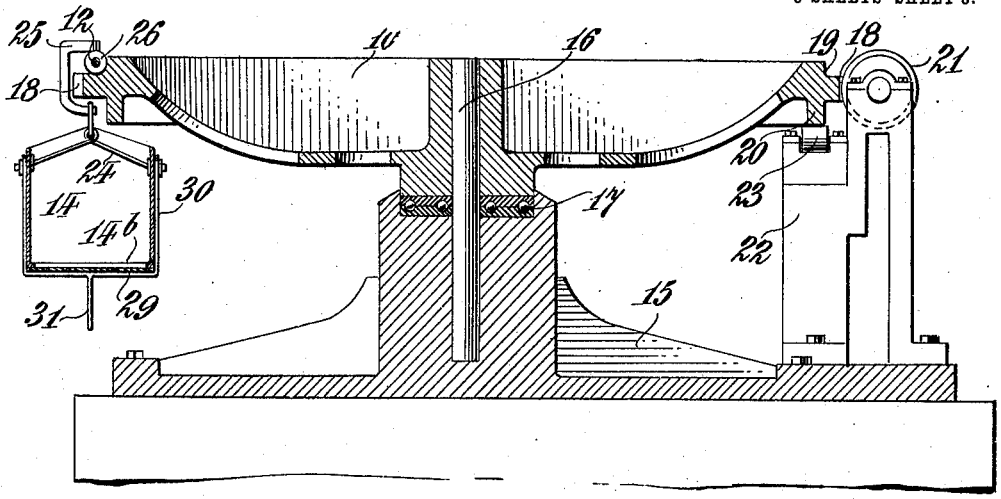
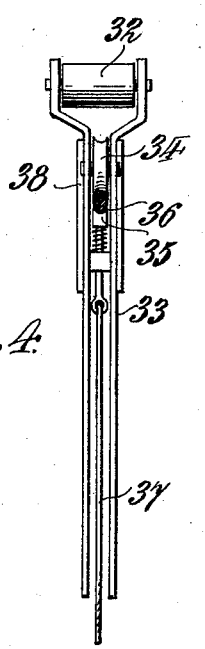
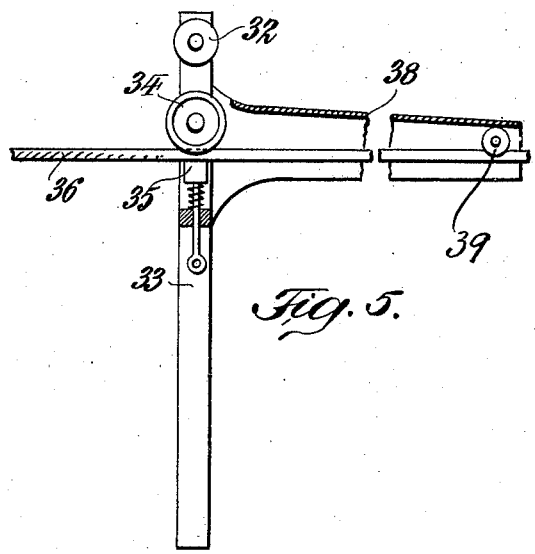

UNITED STATES PATENT OFFICE.

VICTOR JOHNSON, OF NEW YORK, N. Y., ASSIGNOR OF ONE-FOURTH TO OSCAR SANDHOLM, OF ROCKAWAY BEACH, NEW YORK.

CONVEYER.

987,302.  Specification of Letters Patent.  Patented Mar. 21, 1911.

Application filed February 23, 1909. Serial No. 479,518.

*To all whom it may concern:*

Be it known that I, VICTOR JOHNSON, a resident of the borough of Queens, in the city and State of New York, have invented certain new and useful Improvements in Conveyers, of which the following is a full, clear, and exact specification, such as will enable others skilled in the art to which it appertains to make and use the same.

My invention relates to that class of conveyers in which buckets are hung from an endless chain or the like, and it is especially designed to operate horizontally, or on inclines so that materials may be conveyed from one point and dumped at any desired location.

The invention resides in certain special features of construction and combinations of parts which will be fully described hereinafter and particularly pointed out in the claims.

Reference is now had to the accompanying drawings which illustrate as an example the preferred embodiment of my invention.

In these drawings: Figure 1 is a plan view with parts broken away and certain of the buckets omitted; Fig. 2 is a side elevation of the driving end of the conveyer; Fig. 2$^a$ is a similar view of the opposite end of the conveyer; Fig. 3 is a section on the line 3—3 of Fig. 1; Fig. 4 is an enlarged detail of the trip; and Fig. 5 is a sectional elevation of the same.

The conveyer may be constructed of any length desired; in the drawings only the end portions of the conveyer have been shown since it is there impossible to illustrate the whole length.

In its main parts the conveyer comprises two heavy sheaves 10 and 11 over which runs an endless cable 12 carrying the buckets 14. These sheaves 10 and 11 as shown in Figs. 2, 2$^a$ and 3 are mounted on a bed 15 carrying vertical studs 16 forming the axes of the sheaves; and if desired anti-friction bearings 17 may be provided. The sheave 10 is provided as shown in Fig. 3 with worm teeth 18 on its periphery, above which teeth is a runway 19 and below a track 20. The sheave 11 is similarly constructed excepting that the worm teeth are not provided. The sheave 10 is the driving sheave and its teeth 18 are in mesh with a worm 21 mounted by suitable devices at the side of the sheave 10 adjacent to the sheave 11.

22 indicates a step mounted on the base 15 of the sheave 10 and having a roller 23 on which runs the track 20 of the sheave to brace and prevent vibration of the sheave.

The buckets 14 have bails 24 which are connected to U-shaped hangers 25, thus sustaining the buckets; and the hangers are joined to the cable 12 through the medium of clamps 26 preferably in the form of thimbles. In order to insure the uniform diameter of the cable, notwithstanding the clamps 26, I fasten to the cable between the clamps a number of directly contiguous thimbles 27. These are uniform with the thimbles 26 constituting the clamps and the cable therefore is free to run around the sheaves in the manner shown in the drawings. The hangers 25 embrace the periphery of the sheaves so that the buckets may hang freely and clear of the sheaves in the manner shown in Fig. 3. Further, the driving worm 21 being located at the inner side of the sheave 10 does not interfere with the movement of the cable and buckets as described.

It will be observed that the buckets are open at their upper sides to receive the materials handled and that at their inner sides the buckets are tapered as at 14$^a$ which allows them to pass freely and without cramping around the sheaves. The bottoms of the buckets are formed with openings 14$^b$ which are closed by arc-shaped gates 29. These gates are mounted to swing to open or closed position by means of bails 30 pivoted on the buckets in such a way that the gates normally move by gravity to closed position. The bails are provided with extensions 31 which are adapted to strike trip rollers 32. Of these trip devices any number may be employed. I have shown only one in the drawings. The trip roller 32 is mounted in a hanger frame 33, which carries a sheave 34 running on a supporting cable 36. The hanger 33 also carries a spring latch 35 which engages the cable to hold the trip device in the desired position.

37 indicates a cord attached to the latch 35 and by means of which the latch may be disengaged from the cable 36 and a trip device moved to any position desired. After releasing the cord the latch again engages the cable and holds the trip device. The trip device carries a shield 38 which covers a part of the cable 36 to protect it from materials falling from the buckets. The shield 38 has at its outer end a roller 39 running on the cable 36 to support the shield.

In the operation of the invention the materials to be conveyed are charged into the buckets. This may be done while the conveyer is in motion, owing to the close juxtaposition of the buckets. As the main cable 12 runs with the sheaves the buckets are moved carrying their loads. The trip device is then adjusted to the point at which it is desired to dump the materials. As a result, as the buckets reach the trip device the gates 29 are opened and the materials fall from the buckets on a dump pile or into any receptacle or conveyance which may be provided for this purpose.

Having thus described my invention what I claim as new and desire to secure by Letters Patent of the United States is;—

1. A conveyer comprising a sheave, a cable running over it, a bucket, means including a thimble on the cable to connect the bucket thereto and other thimbles secured to the cable intermediate the first named thimbles and directly contiguous to each other, for the purpose specified.

2. A conveyer having dumping buckets, a trip device for said buckets, a sustaining means for said trip device and a shield carried by the trip device and protecting said sustaining means.

3. A conveyer comprising a sheave, a cable running over said sheave, a plurality of buckets, means including thimbles on the cable for connecting the buckets thereto and means along said cable intermediate said thimbles for spacing them apart.

In testimony whereof I have signed my name to this specification in the presence of two subscribing witnesses.

VICTOR JOHNSON.

Witnesses:
ISAAC B. OWENS,
B. BIGGE.

---

Copies of this patent may be obtained for five cents each, by addressing the "Commissioner of Patents, Washington, D. C."